United States Patent [19]

Weber et al.

[11] Patent Number: 4,697,077

[45] Date of Patent: Sep. 29, 1987

[54] VANE ENCODER ASSEMBLY FOR ADJUSTING AN OPTICAL ENCODER IN A DATA STORAGE DEVICE

[75] Inventors: Otto K. Weber; Sang S. Rhee, both of Chatsworth, Calif.

[73] Assignee: Computer Optical Products, Inc., Chatsworth, Calif.

[21] Appl. No.: 861,987

[22] Filed: May 12, 1986

[51] Int. Cl.$^4$ .......................... G01D 5/34; G11B 5/56; G11B 21/24
[52] U.S. Cl. ................................ 250/231 SE; 360/109
[58] Field of Search ...................... 250/231 SE, 237 G; 356/359; 340/347; 360/77, 109

[56] References Cited

U.S. PATENT DOCUMENTS

| | | | |
|---|---|---|---|
| 4,133,015 | 1/1979 | Butsch | 360/109 |
| 4,185,309 | 1/1980 | Feldstein et al. | 360/109 |
| 4,365,279 | 12/1982 | Kinjo | 360/77 |
| 4,550,352 | 10/1985 | Nakao | 360/109 |
| 4,625,109 | 11/1986 | Nixon | 250/231 SE |

Primary Examiner—David C. Nelms
Assistant Examiner—William L. Oen
Attorney, Agent, or Firm—Beehler, Pavitt, Siegemund, Jagger, Martella & Dawes

[57] ABSTRACT

Accurate gap adjustments in an optical encoder used in a magnetic disk drive are achieved within a vane encoder assembly which incorporates a four-bar linkage. The optical encoder includes a fixed reticle and movable vane disposed between a light source and light detector. The fixed reticle is coupled indirectly to a housing which has a prismatic cavity defined therethrough. The prismatic cavity is characterized by a prismatic axis which is generally perpendicular to the direction of gap adjustment between the reticle and movable vane of the optical encoder. The prismatic cavity further defines four generally parallel hinge lines within the housing in a direction parallel to the prismatic axis of the cavity. A single adjustment screw is coupled to the housing to apply a compressive force to the housing in the direction of the gap adjustment. The exertion of varying amounts of compressive force causes the four-bar linkage defined by the cavity to flex, thereby causing the upper and lower surfaces of the housing to move toward or away from each other in a plano-parallel fashion. As the upper and lower surfaces of the housing move in a plano-parallel fashion, the fixed reticle which is coupled to one of these housing surfaces similarly moves in a plano-parallel fashion with the housing and with respect to the movable vane. Thus, fine gap adjustments between the vane and reticle are achieved without altering their initial angular orientation so that they remain in their initial mutually parallel configuration.

20 Claims, 4 Drawing Figures

VANE ENCODER ASSEMBLY FOR ADJUSTING AN OPTICAL ENCODER IN A DATA STORAGE DEVICE

BACKGROUND OF THE INVENTION

1. Field of the Invention

The present invention relates to an adjusting apparatus in a magnetic disk drive and in particular to a vane encoder assembly used for adjustment of optical encoder elements utilized to position a magnetic head with respect to a magnetic disk.

2. Description of the Prior Art

A magnetic disk drive requires placement of a magnetic read-write head across the radial length of a magnetic disc, typically from 3½" to 8" in diameter with high speed and great accuracy. Typically the magnetic head is mounted on the end of an arm or lever which is rotated through an angular segment of sufficient degree to allow traversal by the magnetic head of the data bearing portion of the magnetic disk. Thus, very small angular displacements of the arm or mechanism carrying the magnetic head must be accurately measured. Optical encoder disks are typically used in the prior art for generating a signal proportional to the angular displacement of that portion of the lever mechanism which displaces the magnetic disc. One such optical encoder assembly is depicted in European Patent Application No. 83 305 785.4 published Apr. 4, 1984 (Bulletin 84/14) and assigned to Quantum Corporation of Milpitas, Calif.

Such optical encoders comprise a photodetector positioned on one side of a fixed reticle. The reticle has a plurality of slots or openings defined therethrough. On the opposing side of the reticle is a movable vane having a multiplicity of lines photolithographically defined thereon. The movable vane is disposed between a light source and the reticle. Movement of the movable vane, which is typically made of glass or other transparent media, causes the photolithographically printed lines to be moved across the openings in the fixed reticle so that the photodiodes are exposed to a series of light pulses, typically having a quadrature relationship with each other, which are a function of the degree of angular movement of the magnetic head across the disk.

The gap distance and parallelism of the movable vane and fixed reticle must be very accurately adjusted in order to insure reliable and accurate operation of the optical encoder assembly.

Such a gap and parallelism adjustment mechanisms have typically involved springs or cantilevered multiple screw adjustments such as shown by Nakao, "Head Adjusting Device", U.S. Pat. No. 4,550,352 (1985).

Alternatively, magnetic heads have been adjusted using a shim apparatus such as generally described in connection with Feldstein et al., "Magnetic Head Adjustment Mechanism", U.S. Pat. No. 4,185,309 (1980).

Spring loader flexure plates have also been utilized to provide sensitive adjustments of magnetic transducer heads in tape transports such as shown by Kolm, "Flexure Mounting Plate", U.S. Pat. No. 3,154.372 (1964).

However, each of these prior art devices either involves the adjustment of more than one element, usually through a screw-type adjustment. Furthermore, it is exceedingly difficult with prior art devices to provide for fine adjustments of gap widths while maintaining parallelism between the two surfaces whose gap width is being adjusted. Gap width and parallelism could be adjusted only by a tedious and highly skilled reiterative adjustment process utilizing an adjustment mechanism which was delicate, expensive to manufacture, and which poorly retained the set adjustment.

Therefore, what is needed is some type of mechanism whereby gap width or spacing adjustments may be made in a manner such that parallelism between the adjusted parts is preserved, which is inexpensive to manufacture, and which is rugged enough to maintain the fine adjustment under relatively rough handling.

BRIEF SUMMARY OF THE INVENTION

In an abstract sense the invention is an improvement in an apparatus for relative spatial adjustment of a first and second planar object while maintaining relative angular orientation of the first and second object. The improvement comprises a four-bar linkage coupled to a selected one of the first and second objects. The four-bar linkage transports the selected one of the first and second objects in a predetermined direction while maintaining angular orientation of the selected one of the first and second objects with respect to the predetermined direction constant. An adjustment mechanism applies a force to the four-bar linkage causing the four-bar linkage to transport the selected one of the first and second objects in the predetermined direction. By reason of the combination of these elements, the selected one of the first and second objects is transported in the predetermined direction thereby altering the relative spatial relationship between the first and second objects while maintaining relative angular orientation of the first and second objects constant.

The four-bar linkage comprises a housing and a prismatic cavity defined through the housing. The prismatic cavity is characterized by a prismatic axis generally perpendicular to the predetermined direction. The prismatic cavity defines four parallel hinge axes within the housing. The adjustment mechanism deforms the housing along the hinge axes.

The improvement of claim 1 wherein the adjustment means is a spring loaded screw arranged and configured with respect to the four-bar linkage means to apply a compressive force to the four-bar linkage means.

In the illustrated embodiment, adjustment mechanism is a spring loaded screw arranged and configured with respect to the four-bar linkage means to apply a compressive force to the four-bar linkage means.

The four-bar linkage means is comprised of integrally molded material through which a prismatic cavity is defined. The prismatic cavity is characterized by a prismatic axis. The prismatic axis is generally perpendicular to the predetermined direction. The prismatic cavity defines four substantially parallel hinge axes parallel to the prismatic axis. The integral four-bar linkage means is comprised of molded plastic.

The invention is also characterized as a vane encoder assembly for use in a magnetic drive. The vane encoder assembly is coupled to a magnetic head for reading a magnetic medium. The assembly comprises an optical encoder including a light source, a light detector, and an optical reticle and optical vane. The reticle and vane are disposed between the light source and detector. The optical vane and reticle are relatively movable with respect to each other Either the vane or reticle is coupled to the magnetic head so that movement of the magnetic head with respect to the magnetic medium causes relative movement of the optical vane or reticle as appropriate. A housing is coupled to a second selected one of the vane and reticle. The housing is employed to vary the spatial separation between the vane and reticle along a predetermined direction without changing relative angular orientation of the vane and reticle. A single adjustment mechanism is provided for actuating the housing to vary the spatial separation between the vane and reticle without change of relative angular orientation between the vane and reticle. As a result the optical encoder is adjusted through a single adjustment whereby a precise and stable adjustment is achieved.

In the illustrated embodiment the reticle is attached to the housing and the detector is coupled to the magnetic head and movable therewith.

The single adjustment mechanism comprises a single adjustment screw for providing a compressive force on the housing. The housing collapses at least to an extent along the predetermined direction in response to the compressive force.

The housing is comprised of molded plastic as an integral body and a cavity defined therethrough which is prismatic with a prismatic longitudinal axis in a direction generally perpendicular to the predetermined direction.

The invention is also a method for adjusting a vane encoder assembly included within an optical recorder in a magnetic disk drive comprising the steps of providing a relatively movable optical reticle and optical vane between a light source and light detector. Either the vane or reticle is coupled to a magnetic head movable with respect to the magnetic disk. The method continues with the step of adjusting the spatial separation between the vane and reticle while maintaining the vane and reticle in a generally parallel relationship by flexing a four-bar linkage. Either the vane or reticle is coupled to the four-bar linkage.

The four-bar linkage is an integral block having a prismatic cavity defined therethrough, and the prismatic cavity defining four generally parallel hinge axes. The step of flexing comprises the step of compressing the integral block in a direction generally perpendicular to the prismatic axis of the cavity defined within the block. The step of compressing comprises tightening an adjustment screw bearing against the block.

The invention is still further characterized as a vane encoder assembly for use in a magnetic disk recorder comprising a base for attachment to the magnetic disk drive, and an integrally plastic molded flexure housing disposed within the base. The housing has a prismatic cavity defined therethrough. The prismatic cavity defines four generally parallel hinge axes within the housing to form a four-bar linkage. An upper plate is disposed on the housing. The upper plate providing a planar surface. A light detecting circuit for detecting incident optical radiation is mounted on the surface of the upper plate. An optical reticle is mounted on the light detecting circuit for providing defined apertures through which optical radiation may impinge upon the light detecting circuit mounted therebelow. A light source holder is mounted on the upper plate. The light source holder includes a receptacle for receiving a light source. A light source is disposed in the receptacle. The light source generates light directed toward the reticle. A movable optical vane is disposed between the light source and reticle for modulating light from the source incident upon the reticle. The movable vane is coupled to the magnetic head within the magnetic disk drive and movable therewith. A single adjustment screw is disposed through the holder and upper plate, and threadably coupled to the base. The adjustment screw contacts the upper plate to thereby exert a compressive force against the upper plate and housing beneath the upper plate. The compressive force causes the housing to flex about the four-bar linkage provided by the four parallel hinge axes of the cavity within the housing.

The vane encoder assembly further comprises a locking screw disposed through the base to urge portions of the base against the housing to provide locking of the upper plate after adjustment for the proper gap. Resilient washers maintain the single adjustment screw under tension.

The invention and its various embodiments may be better understood by now turning to the following detailed description.

DETAILED DESCRIPTION OF THE PREFERRED EMBODIMENTS

Accurate gap adjustments in an optical encoder used in a magnetic disk drive are achieved within a vane encoder assembly which incorporates a four-bar linkage. The optical encoder includes a fixed reticle and movable vane disposed between a light source and light detector. The fixed reticle is coupled indirectly to a housing which has a prismatic cavity defined therethrough. The prismatic cavity is characterized by a prismatic axis which is generally perpendicular to the direction of gap adjustment between the reticle and movable vane of the optical encoder. The prismatic cavity further defines four generally parallel hinge lines within the housing in a direction parallel to the prismatic axis of the cavity. A single adjustment screw is coupled to the housing to apply a compressive force to the housing in the direction of the gap adjustment. The exertion of varying amounts of compressive force causes the four-bar linkage defined by the cavity to flex, thereby causing the upper and lower surfaces of the housing to move toward or away from each other in a plano-parallel fashion. As the upper and lower surfaces of the housing move in a plano-parallel fashion, the fixed reticle which is coupled to one of these housing surfaces similarly moves in a plano-parallel fashion with the housing and with respect to the movable vane. Thus, fine gap adjustments between the vane and reticle are achieved without altering their initial angular orientation so that they remain in their initial mutually parallel configuration.

More generally the present invention is a vane encoder assembly for use in connection with a magnetic disk in which an optical encoder is used for measurement of the movement of the magnetic head. The optical encoder thus comprises at least a fixed reticle on one side of which is a photodetector circuit and on the other side of which is a moving vane. The moving vane has a plurality of optical marks or lines defined in it, so that light impinging upon the moving vane is transmitted theretrouth to openings or windows in the reticle. As a result, a series of light pulses are created which can then be detected and processed according to conventional principles to measure movement of the magnetic head across the disk. The circuitry and photooptical components of the vane encoder assembly are conventional and will not be described or shown in the present application in great detail. The assembly, on which at least one of these components, i.e. the vane or reticle, is mounted, is described and illustrated in the Figures described below. It is important that gap width and parallelism of the reticle and vane be carefully controlled and maintained.

Figure 1:
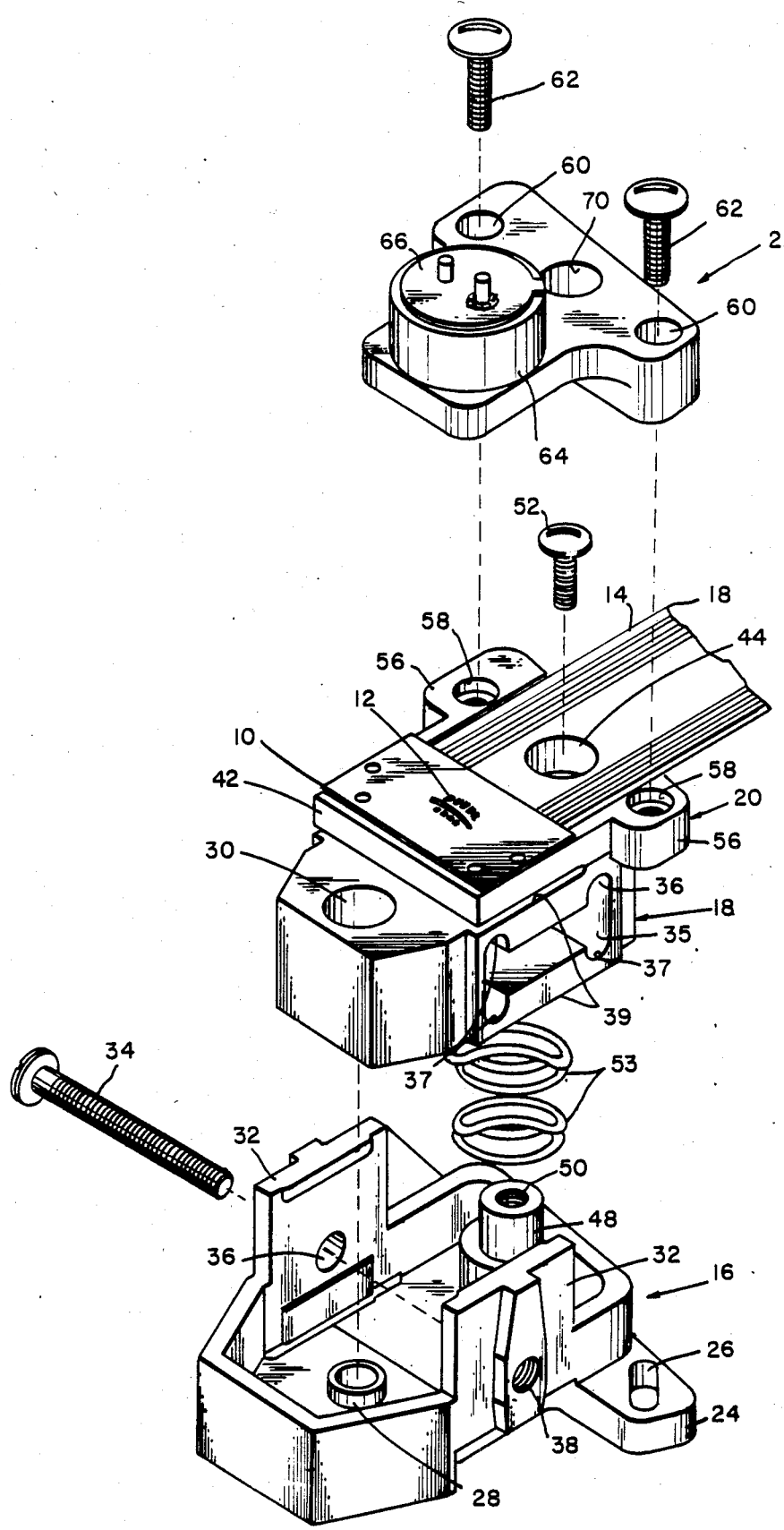
FIG. 1 is an exploded perspective view of a vane encoder assembly according to the invention.
Figure 3:
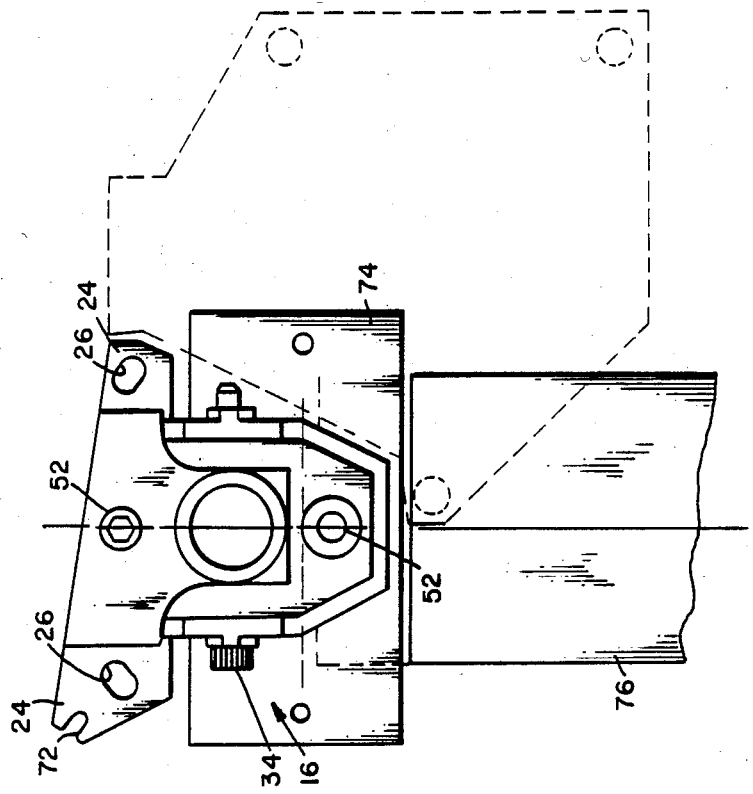
FIG. 3 is a plan elevational view of the assembled vane encoder of FIGS. 1 and 2.
Figure 4:
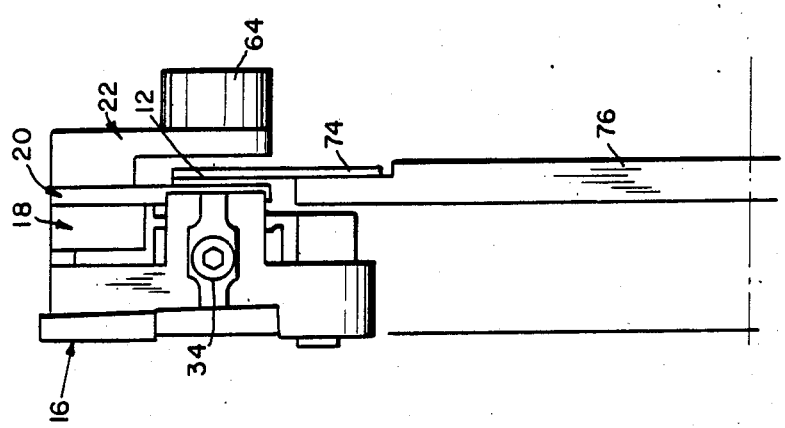
FIG. 4 is a side elevational view of the assembled vane encoder shown in FIG. 3 with an actuator arm added.

Turn now to the exploded perspective view of FIG. 1 wherein the vane encoder assembly of the invention is better described. For the purposes of simplicity, most of the circuitry connected with the optical encoder as well as the movable optical vane have been omitted. Only those portions of the optical encoder assembly necessary to show their essential relationship to the mechanism for mounting and adjusting their relative positions are described. In particular, in the illustrated embodiment a mask 10 is shown upon which a reticle 12 has been fixed. Under mask 10 is the photodiode circuitry (not shown) which is coupled to flexible ribbon connector 14. Alternatively, ribbon connector 14 may be formed on a rigid substrate using conventional printed circuit board technology. A movable vane 74, which is shown in FIGS. 3 and 4, is disposed parallel and close to reticle 12. It is the surface of reticle 12 and vane 74, which is connected to a lever mechanism for transporting the magnetic head (not shown), which must be accurately adjusted and maintained.

The adjustment is provided in the illustrated embodiment by means of a vane encoder assembly comprised of a base, generally denoted by reference numeral 16; a four-bar linkage housing, generally denoted by reference numeral 18; an upper plate, generally denoted by the reference numeral 20; and an LED holder, generally denoted by reference numeral 22. Consider now each of these elements in detail. In the illustrated embodiment, each of these elements are made of molded plastic and therefore can be made with a high degree of precision at extremely low cost.

Base 16 provides a platform upon which the remaining elements 18-22 of the vane encoder assembly may be mounted and provides a means of mounting the vane encoder assembly within the magnetic disk chassis. Flanges 24 are provided with slots 26 defined therein through which slots mounting screws may be disposed for appropriately securing base 16 within the magnetic disk chassis. A third mounting screw (not shown) is similarly disposed through bore 28 defined in base 16 and bore 30 defined through housing 18.

In addition to forming the receiving base through which housing 18 is seated, base 16 includes two opposing vertical flanges 32 which act in combination with a center line locking screw 34 to provide a means for locking the position of housing 16 after the height or gap adjustment has been made. A body bore 36 is defined through one of vertical flanges 32. Similarly, locking screw 34 is disposed through body bore 36 and is threaded into a diametrically opposing threaded bore 38 defined in the opposing vertical flange 32. Screw 34 does not engage housing 18 but serves, when tightened, to draw the inner surfaces of vertical flanges 32 towards each other and into contact with the opposing surface of housing 18 as best depicted in exploded view in FIG. 1.

Housing 18 is seated within base 16 and fits between vertical flanges 32. The tightening of screw 34 will thus cause vertical flanges 32 to contact the sides of housing 18 and automatically center housing 18 in upper plate 20 which is connected to it as described below.

Housing 18 is particularly characterized by a four-bar linkage defined by a prismatic cavity 35 defined therethrough. Cavity 35 is completely defined through the entire width of housing 18 and has an "I"-shaped cross section which, as seen in sectional view in FIG. 2, has a general shape of an "I" lying on its side. In particular, cavity 35 is defined by two vertical portions having upper and lower rounded surfaces 37, which portions are connected by a lateral opening defining the body of the "I".

Housing 18 is thus characterized by upper and lower surfaces 39 over underlying cavity 35. Rounded surfaces 37 of cavity 35, forming the legs of the "I", each acts as a hinge line which allows housing 18 to flex under stress utilizing the inherent resiliency of the plastic material from which housing 18 is fabricated.

As described below, housing 18 is flexed by a gap adjustment screw 52 causing a flexure housing 18 principally along hinge lines 37 thereby allowing surfaces 39 to move closer to each other. However, because of the four-bar linkage formed by hinge lines 37 of cavity 35, any compressive force on housing 18 causes surfaces 39 to maintain a parallel relationship with respect to each other as they are moved.

Upper plate 20 is disposed on top of housing 18 and includes a forward portion 42 cantilevered over housing 18 upon which mask 10 and reticle 12 are mounted and fixed. A flanged body bore 44 is defined through upper plate 20 and is aligned with bore 46 through housing 18. Also defined with base 16 is a bushing 48 having a threaded bore 50 defined therein. Bushing 48 is integral with base 16 and is aligned with bore 46 and bore 44. A gap adjustment screw 52 is disposed into bore 44, through bore 46 and engages threaded bore 50 in bushing 48. The head of gap adjustment screw 52 bears against flange 54 in bore 44, thereby causing a downward compressive force to be exerted against upper plate 20 and thence housing 18 as gap adjustment screw 52 is tightened. As this compressive force is applied through plate 20 by means of screw 52, the four-bar linkage defined by cavity 35 flexes on hinge lines 36 to cause a small vertical gap adjustment of reticle 12 disposed on upper plate 20 while maintaining the parallelism of surfaces 39 of housing 18 and thence of upper plate 20 and reticle 12. In other words, although reticle 12 is not necessarily initially parallel to surfaces 39, any adjustment by means of screw 52 does not alter the spatial orientation of reticle 12 with respect to vane 74 except in a vertical direction for the gap adjustment. At all times during adjustment, reticle 12 and vane 74 will be positioned in mutually parallel planes or at least in planes whose relative angular orientation does not change.

Curved washers 53 are disposed about adjustment screw 52 and between housing 18 and bushing 48. Washers 53 thus form a resilient spring means for maintaining tension on screw 52 as it is tightened and further allowing a predetermined amount of vertical play or adjustment between the elements of the vane encoder assembly.

Upper plate 20 includes two opposing laterally extending flanges 56 into which threaded bores 58 have been defined. LED holder 22 is disposed on upper plate 20 such that corresponding through bores 60 of LED holder 22 are aligned with corresponding threaded bores 58 in flanges 56. Corresponding mounting screws 62 are each disposed through through-bores 60 and threaded into threaded bores 58 whereby LED holder 22 is fixed and aligned with upper plate 20.

The forward portion of LED holder 22 includes an integrally extending cylindrical mount 64 into which a conventional circular LED device 66 is disposed. Mount 64 is provided with an aperture 68 defined through LED holder 22 through which light from LED 66 is transmitted downwardly towards reticle 12 overlying mask 10.

Through-bore 70 is defined through LED holder 22 to provide access to the head of adjustment screw 52. Thus, bore 70 is alighed with bores 44, 46 and 50.

Figure 2:
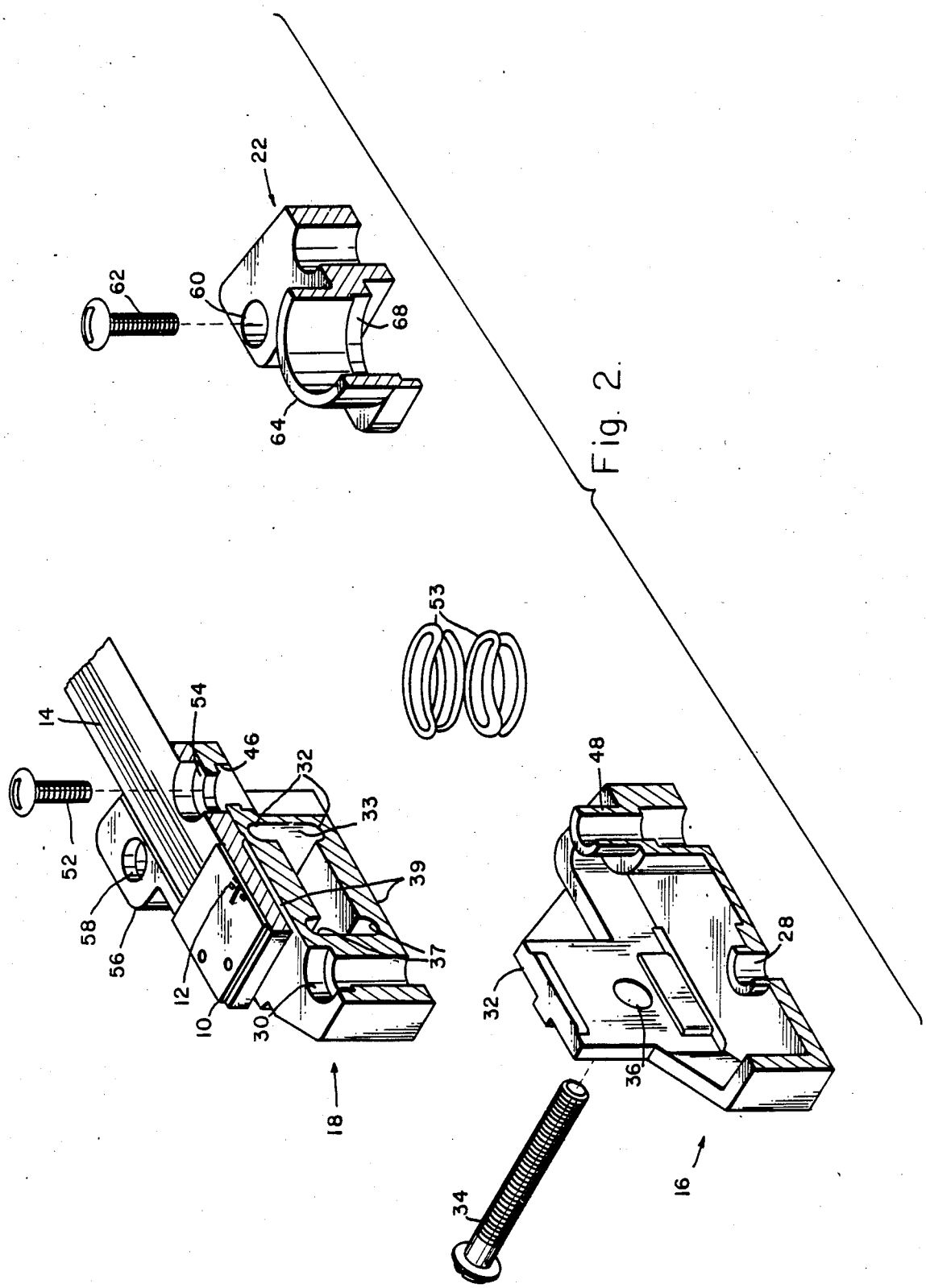
FIG. 2 is a cross-sectional view taken through lines 2—2 of FIG. 1.

FIG. 3 is a plan elevational view of the assembled vane encoder assembly as shown in FIGS. 1 and 2. A groove 72 in flange 24 of base 16 is illustrated in FIG. 3 which allows insertion of a tool, such as a screwdriver, to apply torque to base 16 for fine angular adjustments of vane 74 and reticle 12. In other words, when mounting screws (not shown) disposed through slots 26 in flanges 24 have been somewhat tightened, angular adjustments to base 16, and hence to the vane encoder assembly as a whole, can be made by insertion of a screwdriver within slot 72, by the application of a predetermined amount of torque to angular adjust base 16, and followed by the tightening of the mounting screws within slots 26 to fix the vane encoder assembly in a final position. The top elevational view of FIG. 3 shows movable vane 74 in isolation of actuator arm 76 which is best shown in side elevational view in FIG. 4. As best seen in FIG. 4, an actuator arm 76, connected to the magnetic head which reads the disk through an appropriate linkage, is similarly connected to moving vane 74. Moving vane 74 is thus disposed between LED holder 22 and reticle 12. Typically the gap adjustment between reticle 12 and vane 74 is adjustable within a range of approximately 0.03 inch according to the simple one screw gap adjustment of the invention.

Many modifications and alterations may be made by those having ordinary skill in the art without departing from the scope and spirit of the invention. For example, in the illustrated embodiment the reticle has been shown as fixed and the vane as movable. The opposite configuration, however, is entirely within the scope of the claims. Similarly, a compressive force is shown as being applied by the gap adjustment screw. It is also entirely possible that the four-bar linkage could be preloaded or skewed so that the adjustment force was tensile or upward. In addition springs 53 may be omitted in appropriate applications. The illustrated embodiment has thus been set forth only for the purposes of example and should not be taken as limiting the invention which is defined by the following claims.

I claim:

1. An improvement in an apparatus for relative spatial adjustment of a first and second planar object while maintaining relative angular orientation of said first and second object, said improvement comprising:

four-bar linkage means coupled to a selected one of said first and second objects, said four-bar linkage means for transporting said selected one of said first and second objects in a predetermined direction while maintaining angular orientation of said selected one of said first and second objects with respect to said predetermined direction constant; and adjustment means for applying a force to said four-bar linkage means causing said four-bar linkage means to transport said selected one of said first and second objects in said predetermined direction, whereby said selected one of said first and second objects is transported in said predetermined direction thereby altering the relative spatial relationship between said first and second objects while maintaining relative angular orientation of said first and second objects constant.

2. The improvement of claim 1 wherein said four-bar linkage means comprises a housing and a prismatic cavity defined through said housing, said prismatic cavity characterized by a prismatic axis generally perpendicular to said predetermined direction, said prismatic cavity defining four parallel hinge axes within said housing, said adjustment means deforming said housing along said hinge axes.

3. The improvement of claim 1 wherein said adjustment means is a spring loaded screw arranged and configured with respect to said four-bar linkage means to apply a compressive force to said four-bar linkage means.

4. The improvement of claim 2 wherein said adjustment means is a spring loaded screw arranged and configured with respect to said four-bar linkage means to apply a compressive force to said four-bar linkage means.

5. The improvement of claim 1 wherein said four-bar linkage means is comprised of integrally molded material through which a prismatic cavity is defined, said prismatic cavity characterized by a prismatic axis, said prismatic axis generally perpendicular to said predetermined direction, said prismatic cavity defining four substantially parallel hinge axes parallel to said prismatic axis.

6. The improvement of claim 3 wherein said four-bar linkage means is comprised of integrally molded material through which a prismatic cavity is defined, said prismatic cavity characterized by a prismatic axis, said prismatic axis generally perpendicular to said predetermined direction, said prismatic cavity defining four substantially parallel hinge axes parallel to said prismatic axis.

7. The improvement of claim 5 wherein said integral four-bar linkage means is comprised of molded plastic.

8. A vane encoder assembly for use in a magnetic drive, said vane encoder assembly coupled to a magnetic head for reading a magnetic medium, said assembly comprising:

an optical encoder including a light source, a light detector, and an optical reticle and optical vane, said reticle and vane disposed between said light source and detector, said optical vane and reticle relatively movable with respect to each other, a selected one of said vane and reticle coupled to said magnetic head so that movement of said magnetic head with respect to said magnetic medium causes relative movement of said optical vane and reticle;

housing means coupled to a second selected one of said vane and reticle, said housing means for varying the spatial separation between said vane and reticle along a predetermined direction without changing relative angular orientation of said vane and reticle; and single adjustment means for actuating said housing means to vary said spatial separation between said vane and reticle without change of relative angular orientation between said vane and reticle, whereby said optical encoder is adjusted through a single adjustment whereby a precise and stable adjustment is achieved.

9. The vane encoder assembly of claim 8 wherein said reticle is attached to said housing means and said detector is coupled to said magnetic head and movable therewith.

10. The vane encoder assembly of claim 8 wherein said housing means comprises an integral body and a cavity defined in said body, said cavity defining four generally parallel hinge lines within said body, said hinge lines forming in combination a four-bar linkage, said body collapsible at least to an extent as permitted by said four-bar linkage in said predetermined direction.

11. The vane encoder assembly of claim 9 wherein said housing means comprises an integral body and a cavity defined in said body, said cavity defining four generally parallel hinge lines within said body forming in combination a four-bar linkage, said body collapsible at least to an extent as permitted by said four-bar linkage in said predetermined direction.

12. The vane encoder assembly of claim 8 wherein said single adjustment means comprises a single adjustment screw for providing a compressive force on said housing means, said housing means collapsing at least to an extent along said predetermined direction in response to said compressive force.

13. The vane encoder assembly of claim 10 wherein said single adjustment means comprises a single adjustment screw for providing a compressive force on said housing means, said housing means collapsing at least to an extent along said predetermined direction in response to said compressive force.

14. The vane encoder assembly of claim 13 wherein said housing means is comprised of molded plastic and wherein said integral body is an integral plastic body and wherein said cavity defined therethrough is prismatic with a prismatic longitudinal axis in a direction generally perpendicular to said predetermined direction.

15. A method for adjusting a vane encoder assembly included within an optical recorder in a magnetic disk drive comprising the steps of:

providing a relatively movable optical reticle and optical vane between a light source and light detector, a selected one of said vane and reticle being coupled to a magnetic head movable with respect to said magnetic disk; and adjusting the spatial separation between said vane and reticle while maintaining said vane and reticle in a generally parallel relationship by flexing a four-bar linkage, a selected second one of said vane and reticle being coupled to said four-bar linkage.

16. The method of claim 15 where in said step of flexing said four-bar linkage, said four-bar linkage is an integral block having a prismatic cavity defined therethrough, said prismatic cavity defining four generally parallel hinge axes, said step of flexing comprising the step of compressing said integral block in a direction generally perpendicular to said prismatic axis of said cavity defined within said block.

17. The method of claim 16 where said step of compressing comprises tightening an adjustment screw bearing against said block.

18. A vane encoder assembly for use in a magnetic disk recorder comprising:

a base for attachment to said magnetic disk drive;

an integrally plastic molded flexure housing disposed within said base, said housing having a prismatic cavity defined therethrough, said prismatic cavity defining four generally parallel hinge axes within said housing to form a four-bar linkage;

an upper plate disposed on said housing, said upper plate providing a planar surface;

a light detecting means for detecting incident optical radiation mounted on said surface of said upper plate;

an optical reticle mounted on said light detecting means for providing defined apertures through which optical radiation may impinge upon said light detecting means mounted therebelow;

a light source holder mounted on said upper plate, said light source holder including means for receiving a light source;

a light source disposed in said means for receiving said light source, said light source generating light directed toward said reticle;

a movable optical vane disposed between said light source and reticle for modulating light from said source incident upon said reticle, said movable vane coupled to said magnetic head within said magnetic disk drive and movable therewith; and a single adjustment screw disposed through said holder, and upper plate and threadably coupled to said base, said adjustment screw contacting said upper plate to thereby exert a compressive force against said upper plate and housing beneath said upper plate, said compressive force causing said housing to flex about said four-bar linkage provided by said four parallel hinge axes of said cavity within said housing.

19. The vane encoder assembly of claim 18 further comprising a locking screw disposed through said base to urge portions of said base against said housing to provide locking of said upper plate after adjustment of relative separation of said vane and reticle.

20. The vane encoder assembly of claim 18 further comprising resilient washer means for maintaining said single adjustment screw under tension.

* * * * *